(12) United States Patent
Mackenzie et al.

(10) Patent No.: US 7,138,913 B2
(45) Date of Patent: Nov. 21, 2006

(54) SELECTIVE REPORTING OF EVENTS IN ASSET TRACKING SYSTEM

(75) Inventors: Patricia D. Mackenzie, Clifton Park, NY (US); Christopher Kelley, Lafayette Hill, PA (US); Joseph E. Jesson, Hamilton Square, NJ (US)

(73) Assignee: Transport International Pool, Inc., Devon, PA (US)

( * ) Notice: Subject to any disclaimer, the term of this patent is extended or adjusted under 35 U.S.C. 154(b) by 167 days.

(21) Appl. No.: 10/835,079

(22) Filed: Apr. 29, 2004

(65) Prior Publication Data

US 2006/0202817 A1 Sep. 14, 2006

Related U.S. Application Data

(60) Provisional application No. 60/552,487, filed on Mar. 12, 2004.

(51) Int. Cl.
*G08B 1/08* (2006.01)

(52) U.S. Cl. .................. 340/539.13; 340/539.14; 340/539.1; 340/426.19; 340/568.1; 340/825.36; 340/825.49

(58) Field of Classification Search .......... 340/539.13, 340/539.14, 539.1, 426.19, 568.1, 825.36, 340/825.49
See application file for complete search history.

(56) References Cited

U.S. PATENT DOCUMENTS

| | | | |
|---|---|---|---|
| 4,141,006 A | 2/1979 | Braxton | |
| 5,581,608 A | 12/1996 | Jreij et al. | |
| 6,225,901 B1 * | 5/2001 | Kail, IV | 340/539.11 |
| 6,252,544 B1 * | 6/2001 | Hoffberg | 342/357.1 |
| 6,631,271 B1 | 10/2003 | Logan | |
| 6,919,803 B1 * | 7/2005 | Breed | 340/539.14 |
| 6,975,224 B1 * | 12/2005 | Galley et al. | 340/539.18 |

* cited by examiner

*Primary Examiner*—Daryl C Pope
(74) *Attorney, Agent, or Firm*—Buckley, Maschoff & Talwalkar LLC

(57) ABSTRACT

In GPS based and other types of asset tracking system, event masking rules may be applied at asset tracking units and/or at a central station to determine whether to report events detected by the asset tracking units. The events may pertain to transportation vehicles such as truck trailers or cargo containers to which the asset tracking units are attached. The event masking rules may be defined at the central station and downloaded by satellite communication to the asset tracking units and/or the rules may be defined locally, at the asset tracking units.

25 Claims, 10 Drawing Sheets

SELECTIVE REPORTING OF EVENTS IN ASSET TRACKING SYSTEM

CROSS-REFERENCE TO RELATED APPLICATION

This application claims the benefit of U.S. Provisional Application Ser. No. 60/552,487 filed on Mar. 12, 2004, which is incorporated herein by reference.

FIELD

The present invention relates to asset tracking systems and is more particularly concerned with reporting of events in asset tracking systems.

BACKGROUND

Extensive systems have been deployed to use GPS (Global Positioning System) capabilities for the purpose of tracking vehicle fleets of, e.g., truck trailers, truck tractors and/or trucks; or railcars; or fleets of cargo containers. Such systems have been referred to as "asset tracking systems" and deploy asset tracking units designed to be attached to individual vehicles. Each asset tracking unit typically includes a GPS receiver that is capable of receiving GPS signals from a plurality of GPS satellites and determining the unit's location based on the GPS signals. Upon obtaining a position fix, the asset tracking unit may report the unit's location via satellite communication (using another set of satellites) or the like to a central station. With such a system, the proprietor of the vehicle fleet may have close to real-time information concerning the whereabouts of all vehicles in the fleet. This may lead to significant efficiencies in planning and managing assignments of vehicles to particular tasks. In addition, an asset tracking system of this type may help in the detection of, and response to, irregularities such as theft of vehicles or their contents.

It has been proposed to install one or more sensors in or on a vehicle with the sensor(s) interfaced to the asset tracking unit assigned to the vehicle. The sensor(s) may detect changes in conditions related to the vehicle such as opening or closing of a door of a vehicle, loading or unloading of cargo in or from the vehicle and (where the vehicle is a truck trailer) coupling or de-coupling of the vehicle to or from a truck tractor. The sensor(s) may provide signals indicative of such events to the asset tracking unit, which may then report the events to the central station to increase the amount of information about operation of the vehicle that is present in the asset tracking system. In at least some cases, the system may notify a user/attendant of the events, and the user/attendant may take steps to respond to the events.

Potential disadvantages of reporting and responding to events in an asset tracking system may involve expenditure of resources such as battery power capacity of the asset tracking units, use of satellite communication systems and charges for such use, and attendant time and attention for receiving reports of events and/or responding to such reports.

SUMMARY

To alleviate problems inherent in the prior art, the present invention introduces improved asset tracking systems, asset tracking units and methods for operating the same.

According to one embodiment, a method includes entering an event masking parameter into a server computer, generating an event masking rule based at least in part on the entered event masking parameter, downloading the event masking rule from the server computer to an asset tracking unit, detecting an event (where the detecting occurs at the asset tracking unit), and determining at the asset tracking unit (based at least in part on the downloaded event masking rule) whether to report the detected event.

According to another embodiment, a method includes providing an asset tracking unit that is attached to a transportation vehicle, detecting an event that is related to the transportation vehicle (where the detecting occurs at the asset tracking unit) and determining (based at least in part on an event masking rule) whether to report the detected event.

According to still another embodiment, a method includes providing an asset tracking unit that is attached to a transportation vehicle, detecting an event in which the transportation vehicle exits from a predetermined geographical area, and determining—based at least in part on a time of day at which the event occurs (or some other rule)—whether to report the detected event.

According to yet another embodiment, a method includes providing an asset tracking unit that is attached to a truck trailer, detecting an event in which the truck trailer is coupled to a truck tractor, and reporting the event only if the asset tracking unit detects that the truck trailer is moved by at least a predetermined distance after the detected event (or based on some other rule).

According to yet a further embodiment, a method includes providing an asset tracking unit that is attached to a truck trailer, detecting an event in which a door of the truck trailer is opened or closed, and refraining from reporting the event if the event occurred within less than a predetermined period of time after a prior event in which the door was opened or closed (or based on some other rule).

According to still a further embodiment, a method includes providing an asset tracking unit that is attached to a truck trailer, detecting an event in which a door of the truck trailer is opened or closed, and refraining from reporting the event unless the event occurred within less than a predetermined period of time after at least one prior event in which the door was opened or closed.

According to yet another embodiment, an asset tracking system includes a server computer, a plurality of asset tracking units, each attached to a respective transportation vehicle, and a central station. The server computer is programmed to receive inputs from at least one user to enter at least one event masking parameter, generate at least one event masking rule based at least in part on the entered at least one event masking parameter, and download the at least one masking rule to at least one of the asset tracking units. The at least one asset tracking unit is programmed to receive and store a downloaded event masking rule, detect an event, and determine (based at least in part on the downloaded at least one event masking rule) whether to report the detected event to the central station.

According to still another embodiment, an asset tracking unit includes a controller, a GPS receiver coupled to the controller, an event mechanism coupled to the controller for receiving at least one event signal from at least one sensor, a storage mechanism coupled to the controller for storing at least one event masking rule, and a transmitter coupled to the controller. The controller is programmed to receive an event signal via the event mechanism (where the event signal is indicative of an event) and determine—based at least in part on an event masking rule stored in the storage mechanism—whether to report the event via the transmitter.

As used herein and in the appended claims:

"transportation vehicle" includes a truck, a truck trailer, a truck tractor, a railcar, a locomotive, a cargo container, or other storage container;

"cargo container" includes a container suitable for shipment via one or more of container ships, barges, truck chassis, railcars and air transports;

"event" refers to any change in a condition in, on or pertaining to a transportation vehicle that may be detected by a sensor and/or by an asset tracking unit;

"asset tracking unit" refers to any device that may be attached to a transportation vehicle and has (a) GPS capability for determining the current location of the vehicle and/or (b) reporting capability for reporting to a central station the current location of, or other information about, the vehicle;

"event masking rule" refers to any algorithm, instruction or set of instructions which causes an asset tracking unit and/or a central station to determine whether or not to report an event detected by an asset tracking unit and/or by a sensor interfaced to the asset tracking unit.

In an asset tracking system according to the invention, intelligence resides in components of the system such as asset tracking units to determine when and whether it is appropriate to report events. Events may only be reported when the reporting of the event is likely to be of significant importance to a user of the system. Consequently, power consumption by the asset tracking units may be reduced, thereby increasing effective battery life for the asset tracking units. Also, costs for transmitting messages to report events may be saved. In addition, users/attendants may be relieved of the burden of being informed of and/or responding to events that are of little or no importance. As a result, labor costs involved in operating the asset tracking system may be reduced, and more reliable responses to important events may be encouraged.

With these and other advantages and features of the invention that will become hereinafter apparent, the invention may be more clearly understood by reference to the following detailed description of the invention, the appended claims, and the drawings attached herein.

DETAILED DESCRIPTION

System Overview

Figure 1:
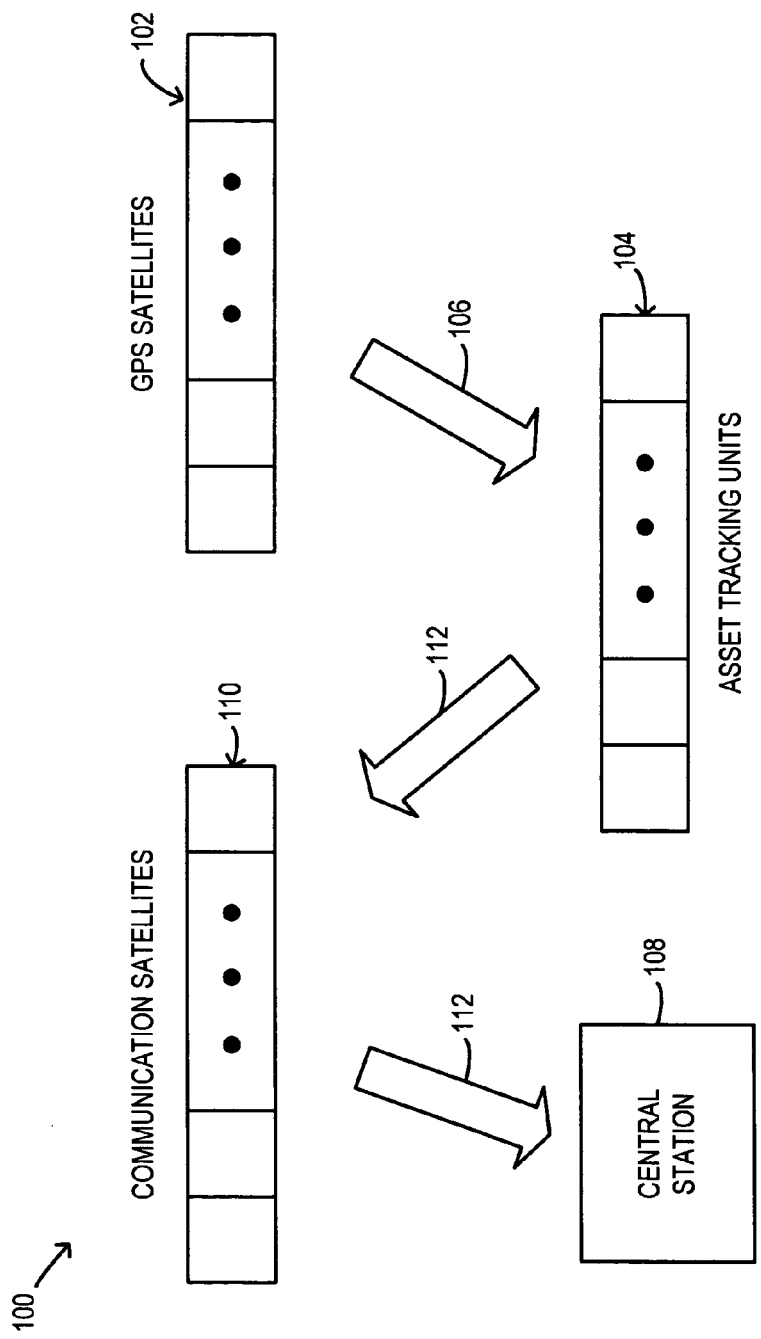
FIG. 1 is a schematic illustration of an asset tracking system according to some embodiments.

Turning now in detail to the drawings, FIG. 1 is a schematic illustration of an asset tracking system provided according to some embodiments of the present invention. In FIG. 1, reference numeral 100 generally indicates the asset tracking system. The asset tracking system 100 may be arranged to use GPS satellites 102, which may be the constellation of 24 satellites provided by the U.S. government for military and civilian position determination applications. A brief description of the U.S. government-provided GPS satellites and typical operations utilizing the satellites is contained in U.S. Pat. No. 6,104,978, which is incorporated herein by reference. Use of the GPS satellites 102 may be shared with other asset tracking systems and/or with other applications which require position determinations.

The asset tracking system 100 includes a plurality of asset tracking units 104, which will be described in more detail below. Each asset tracking unit 104 (other than spares or unassigned units) may be attached to a respective transportation vehicle (e.g., a truck trailer or railcar, not separately shown in FIG. 1) which is free to travel over a wide geographical area. Thus the asset tracking units 104 may be widely dispersed. The number of asset tracking units 104 may be at least as large as the number of transportation vehicles in the fleet to be managed using the asset tracking system 100. For example, the number of asset tracking units 104 in the asset tracking system 100 may be in the thousands, tens of thousands or even hundreds of thousands.

At various times and/or on various occasions, the asset tracking units 104 receive the signals (represented at 106) broadcast by the GPS satellites 102 and use the received GPS signals to make determinations of the respective positions of the asset tracking units 104.

The asset tracking system 100 also includes a central station 108 which monitors the locations of, and/or other conditions related to, the transportation vehicles to which the asset tracking units 104 are attached. The asset tracking units 104 send to the central station 108 messages which indicate current locations of the asset tracking units 104 and/or messages that report events related to the transportation vehicles to which the asset tracking units are attached. Messaging from the asset tracking units 104 may utilize a satellite communication system which comprises communication satellites 110. The communication satellites 110 may be shared with other users in addition to the asset tracking system 100. The communication paths from the asset tracking units 104 to the central station 108 via the communication satellites 110 are schematically represented by arrows 112. In some embodiments, two-way communication between the central station 108 and the asset tracking units 104 may be supported. In some embodiments, another communication system (e.g., a cellular telephone network)

may be used for communication between the asset tracking units 104 and the central station 108 in addition to or instead of the satellite communication system shown in FIG. 1. In some embodiments, more than one central station may exchange communications with the asset tracking units 104.

In some embodiments, all of the hardware aspects of the asset tracking system 100 may be conventional, and functionality in accordance with the present invention may be provided by suitable programming of the central station 108 and the asset tracking units 104.

In some embodiments, some or all of the asset tracking units 104 may transmit to the central station 108 raw or partially processed data derived by the asset tracking units from GPS satellite signals received by the asset tracking units, and the central station may calculate position fixes for the asset tracking units from such data, instead of the asset tracking units calculating position fixes for themselves and transmitting reports of their locations to the central station.

Typical Asset Tracking Unit

Figure 2:
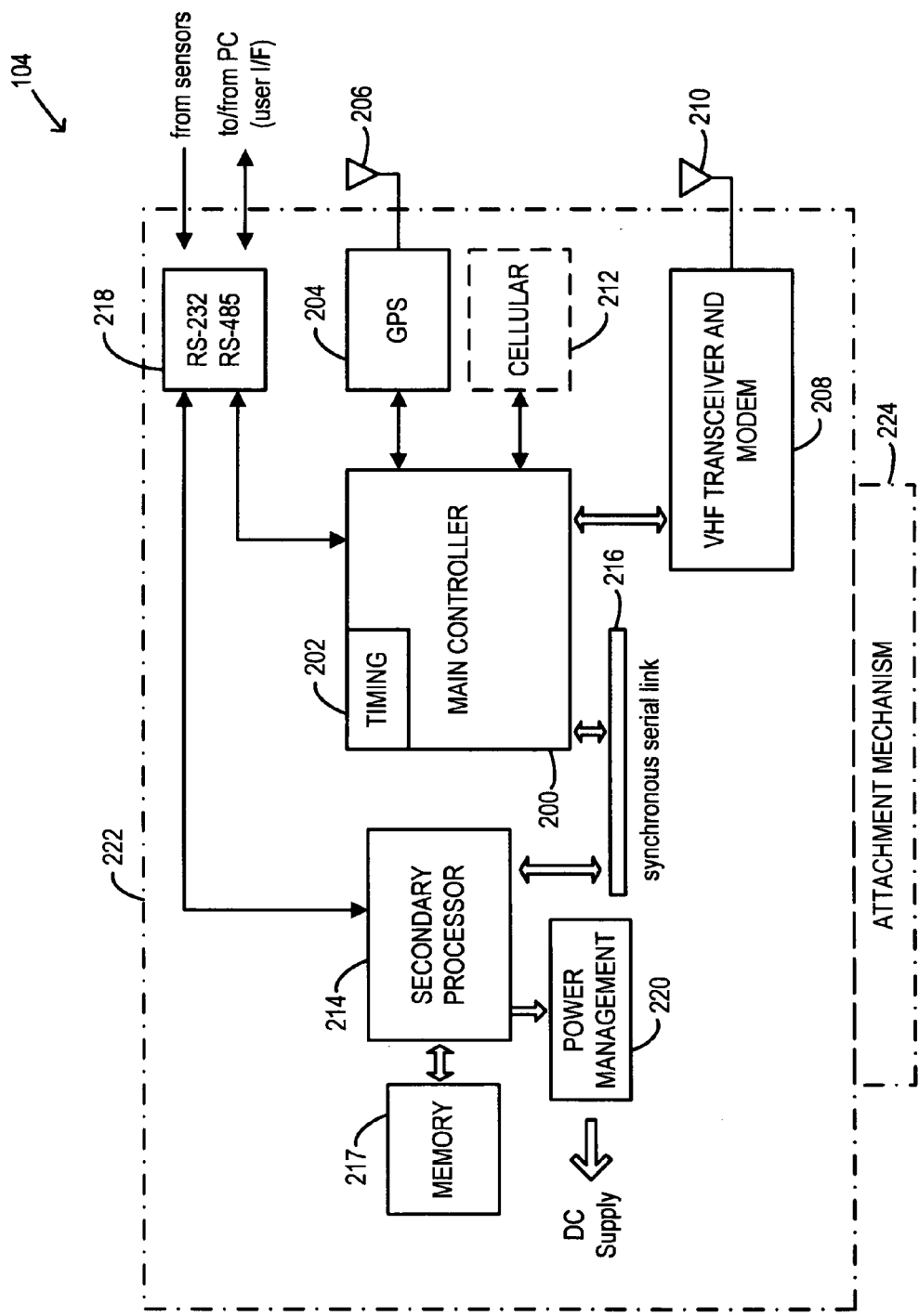
FIG. 2 is a block diagram of a typical one of the asset tracking units that may be included in the asset tracking system of FIG. 1.

FIG. 2 is a block diagram representation of a typical one of the asset tracking units 104.

The asset tracking unit 104 illustrated in FIG. 2 includes a main controller 200, which may, for example, comprise a digital signal processor and a microprocessor, which are not separately shown. As indicated at 202, the main controller may include a capability for timing and/or defining periods of time during which operations of the asset tracking unit 104 may be performed or during which the asset tracking unit 104 may refrain from performing certain operations. The main controller 200 may be embodied as a main circuit board assembly (not separately shown) of the asset tracking unit and may include program and working memory, which also are not separately shown.

The asset tracking unit 104 may also include a GPS receiver 204 which is coupled to the main controller 202. The GPS receiver 204 may be configured in a conventional fashion to receive GPS satellite signals via an antenna 206 and to provide position information to the main controller 202. The position information may reflect a position fix for the asset tracking unit 104 determined by the GPS receiver 204. In some embodiments, the GPS receiver 204 may be constituted as a daughter board (not separately shown) mounted on the main circuit board (not separately shown) which embodies the main controller 200.

The asset tracking unit 104 may further include a VHF transceiver (transmitter-receiver) and modem combination 208, which is coupled to the main controller 200. The VHF transceiver and modem 208 may operate in a conventional fashion under the control of the main controller 200 to send messages from the asset tracking unit 104 to the central station 108 (FIG. 1) via an antenna 210. The VHF transceiver and modem may also operate to receive messages for the asset tracking unit 104 from the central station 108.

In some embodiments, the asset tracking unit 104 may include, in addition to or instead of the VHF transceiver and modem 208, a module 212 (shown in phantom) by which the asset tracking unit 104 is able to communicate with the central station 108 via a cellular telephone communication network. The cellular communication module 212 may be coupled to the main controller 200.

In some embodiments, the asset tracking unit 104 may further include a secondary processor 214 (e.g. another microprocessor) that is coupled to the main controller 200 via a synchronous serial data link 216. The secondary processor 214 may execute one or more applications to implement rules by which the asset tracking unit may operate, including event masking rules which are described further below. The secondary processor 214 may, for example, be at least partially programmable remotely via messages from the central station 108 or from data messages provided via external data interfaces discussed below. The asset tracking unit 104 also includes one or more memory devices 217, which may include program and data storage memory and working memory. For example, the memory devices 217 may comprise more than one memory device, including one or more nonvolatile memory devices, and may store one or more event masking rules.

The main controller 200 and the secondary processor 214 may together be considered to constitute a controller for the asset tracking unit 104.

There may also be included in the asset tracking unit 104 one or more data communication interfaces 218 (e.g., one or more RS-232 and/or RS-485 data communication interfaces) coupled to the main controller 200 and/or to the secondary processor 214. The main controller 200 and/or the secondary processor 214 may receive, via the data communication interfaces 218, input signals from one or more sensors (not shown in FIG. 2) installed in association with a transportation vehicle (not shown in FIG. 2) to which the asset tracking unit 104 is attached. The input signals from the sensors may inform the asset tracking unit 104 of events relative to the transportation vehicle. For example, the sensors may provide signals to the asset tracking unit 104 via the interfaces 218 to indicate when a door or doors of the transportation vehicle are opened or closed; when, in the case where the transportation vehicle is a truck trailer, the transportation vehicle is coupled to or de-coupled from a truck trailer; and/or when a cargo is loaded into or unloaded from the transportation vehicle.

One or more communication interfaces 218 may also provide part of a data communication path between the asset tracking unit 104 and an external data processing device (not shown), such as a personal computer that a user may operate to communicate with the asset tracking unit 104.

The asset tracking unit 104 may also include a power management module 220 coupled to the secondary processor 214 and operable to optimize consumption of power by the asset tracking unit 104. For that purpose the power management module 220 may interoperate with a power supply (not shown) for the asset tracking unit, which may include one or more batteries (not shown).

Further, the asset tracking unit 104 may include a housing 222 (indicated with a dash-dot line) which supports and/or contains all the other components of the asset tracking unit 104. In addition, the asset tracking unit 104 may include a conventional mechanism 224 (also indicated with a dash-dot line) by which the housing 222 may be secured to a transportation vehicle.

The main controller 200 may be programmed with one or more software programs that control operation of the main controller 200. Such programs may include, for example, a so-called "kernel" which provides low-level control operations, operating system functions (as in a "PSOS" operating system) and device drivers. The software which controls the main controller 200 may also include capabilities for sending and/or receiving electronic mail messages via the VHF transceiver and modem 208 to and/or from the central station 108 (FIG. 1). Other functions, such as power management (e.g., selectively shutting down and re-activating components of the asset tracking unit 104, initiating and concluding sleep modes, etc.), may also be performed under the control of software that programs the main controller 200. In addition the main controller, and/or the secondary processor 214, may be programmed to perform functions in accordance with the invention, as described below.

Figure 3:
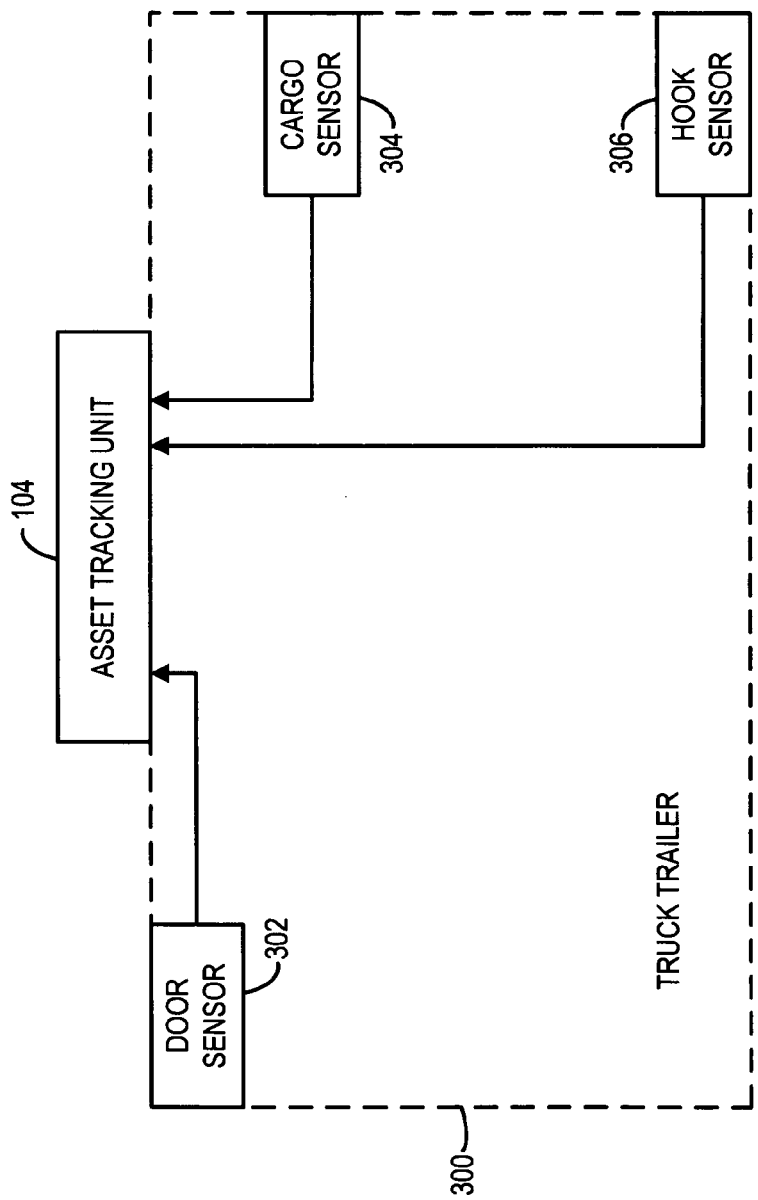
FIG. 3 is a schematic illustration of an asset tracking unit and related sensors installed on a truck trailer in accordance with some embodiments.

FIG. 3 is a schematic illustration which shows (in phantom) a truck trailer 300 having equipment installed thereon to facilitate tracking and management of the truck trailer by the asset tracking system. In particular, an asset tracking unit 104 (which may be like the device illustrated in FIG. 2) is attached to the truck trailer. In addition, a door sensor 302, a cargo sensor 304 and a "hook" sensor 306 are all installed in or on the truck trailer. The door sensor 302 is able to sense whether one or more doors (not separately shown) of the truck trailer are in an open or closed position, or alternatively, is able to sense events in which the door(s) are opened or closed. The sensor 302 is coupled to the asset tracking unit 104 to provide to the asset tracking unit a signal or signals to indicate the status of the door(s) and/or indications of door opening/closing events.

The cargo sensor 304 may be, for example, an acoustic, optical or piezo-electric device which is able detect whether or not a cargo is present in the truck trailer. In some embodiments, the cargo sensor includes a laser to project a pattern on a surface such as the floor of the truck trailer and a camera to capture an image of the laser pattern. The cargo sensor may be able to interpret a disruption in the captured pattern to indicate the presence of a cargo in the truck trailer. The cargo sensor is coupled to the asset tracking unit 104 to provide to the asset tracking unit a signal or signals to indicate whether a cargo is present in the truck trailer and/or indications of events in which a cargo is loaded into the trailer or unloaded from the trailer.

The "hook" sensor 306 may be coupled to the so-called "seven way connector" (not separately shown) by which the truck trailer may be coupled to a truck tractor (not shown) to receive electrical and/or braking power from the truck tractor. The hook sensor may detect the presence or absence of power supplied from the truck tractor and may thereby be able to sense whether or not the truck trailer is coupled to a truck tractor. The hook sensor 306 is coupled to the asset tracking unit 104 to provide to the asset tracking unit a signal or signals to indicate whether the trailer is coupled to a truck tractor and/or indications of events in which the trailer is coupled to or decoupled from a truck tractor.

In some embodiments, the number of sensors installed in the trailer and interfaced to the asset tracking unit may be more or fewer than the number shown in FIG. 3 and/or the types of sensor may be different from those shown. For example, the sensors installed in the trailer and interfaced to the asset tracking unit may include one or more accelerometers to permit detection of events such as excessive vibration (e.g., vibration in excess of a predetermined degree of vibration), collision, excessive tilting (e.g., tilting in excess of a predetermined degree of tilting). There may also be installed in the trailer one or more RFID (radio frequency identification readers) interfaced to the asset tracking unit to permit detection of events such as detection of one or more RFID tags, or a failure to detect one or more RFID tags at a time or times when detection of such tags is expected.

Figure 4:
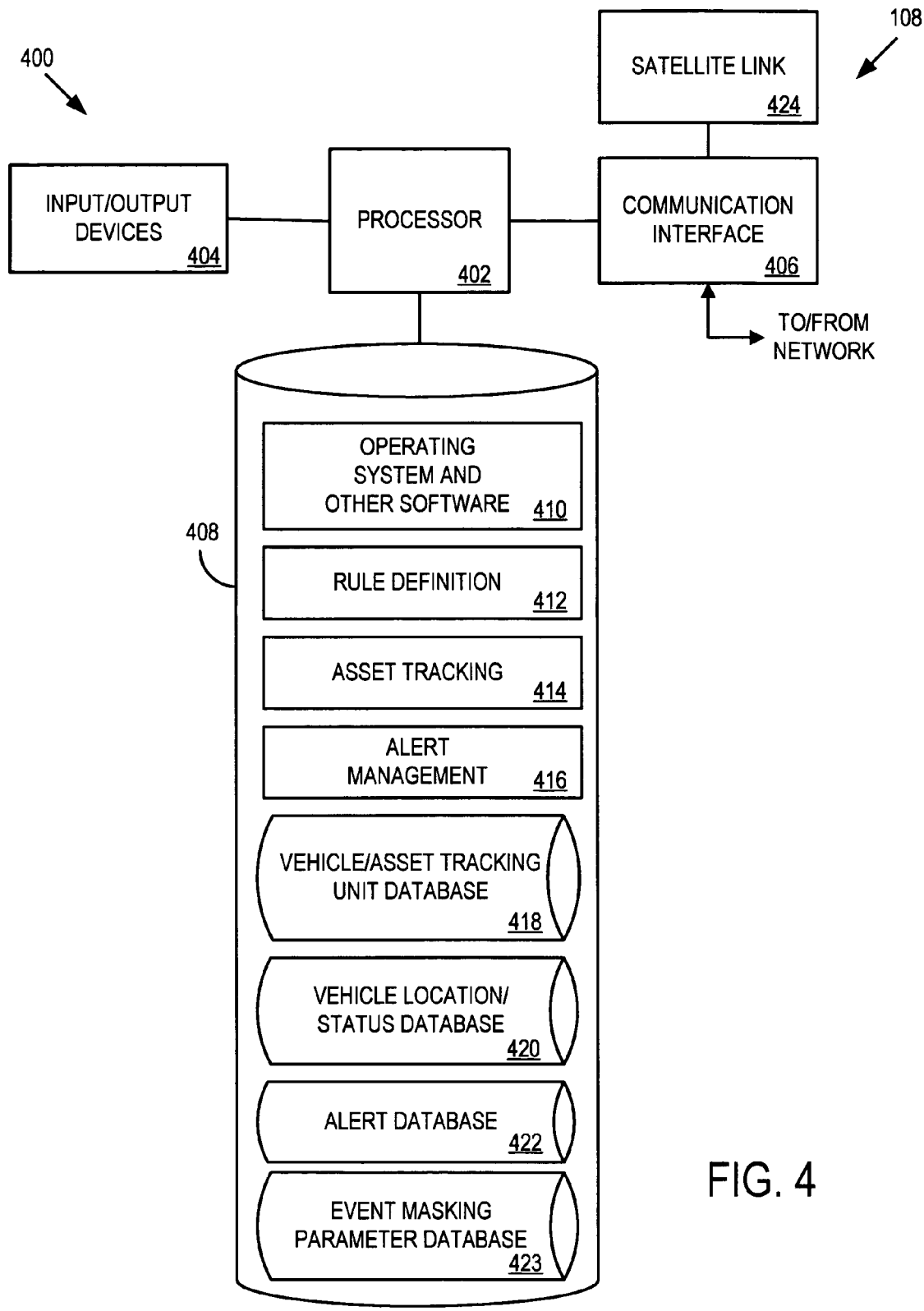
FIG. 4 is a block diagram of a central station that is part of the asset tracking system of FIG. 1.

FIG. 4 is a block diagram which shows some details of the central station 108 (see also FIG. 1) as it may be provided according to some embodiments of the invention.

The central station 108 may include a server computer 400 which performs major data processing, data storage and administrative functions of the central station 108.

The server computer 400 may generally be constructed of conventional hardware components, including a processor 402. The processor 402 may be constituted by one or more conventional microprocessors, for example.

The server computer 400 may also include a number of input and/or output devices (generally indicated by block 404) including computer monitors, keyboards, pointing devices such as computer mice, printers, speakers, alarm annunciators, etc., coupled to and/or controlled by the processor 402. The server computer 400 also includes a communication interface 406 coupled to the processor 402 to allow the server computer 400 to engage in data communication, messaging, etc., with other data processing or electronic devices, which may be remotely located from the server computer 400.

In addition, the server computer 400 includes one or more storage devices 408 coupled to the processor. In addition to RAM (working and temporary memory) and/or ROM, which are not separately shown, the storage device(s) 408 may include one or more fixed disk drives that provide mass storage and/or program storage for the server computer 400. Among the software that may be stored in the storage device(s) 408 may be a conventional operating system, device drivers and conventional web page hosting and server function software, all of which are schematically indicated by block 410.

In addition, the storage device(s) 408 may store an application 412, provided in accordance with aspects of the present invention, to enable the server computer 400 to process user input and to generate event masking rules to be downloaded to asset tracking units 104, as will be described in more detail below. Moreover, the storage device(s) 408 may also store another application 414 that causes the server computer to generally function as the computer intelligence of the central station 108 for the purpose of tracking and managing vehicle assets to which the asset tracking units 104 are attached.

Also, the storage device(s) 408 may store software 416 that enables the server computer to manage alerts generated in the system with respect to events which require special attention by a user/attendant or other extraordinary measures.

The storage device(s) 408 may also store one or more databases, including:

(A) A vehicle/asset tracking unit database 418 which stores data to indicate assignments of particular asset tracking units to particular vehicles in the vehicle fleet to be tracked by the asset tracking system;

(B) A vehicle location/status database 420 which collects data generated by and uploaded from the asset tracking units to indicate the current locations of the vehicles or the fleet and/or other information concerning the vehicles;

(C) An alert database 422 which stores data concerning alerts generated by the alert management software 416; and (D) An event masking parameter database 423 for storing user-defined parameters.

In addition to the server computer 400, the central station 108 may include satellite earth station equipment 424, by which the server computer is able to receive and send data messages via the communication satellites 110 (FIG. 1). In particular, via the satellite earth station equipment 424 and/or the communication interface 406, the server computer 400 is able to receive messages from the asset tracking units 104 and to send messages to the asset tracking units 104.

Figure 5:
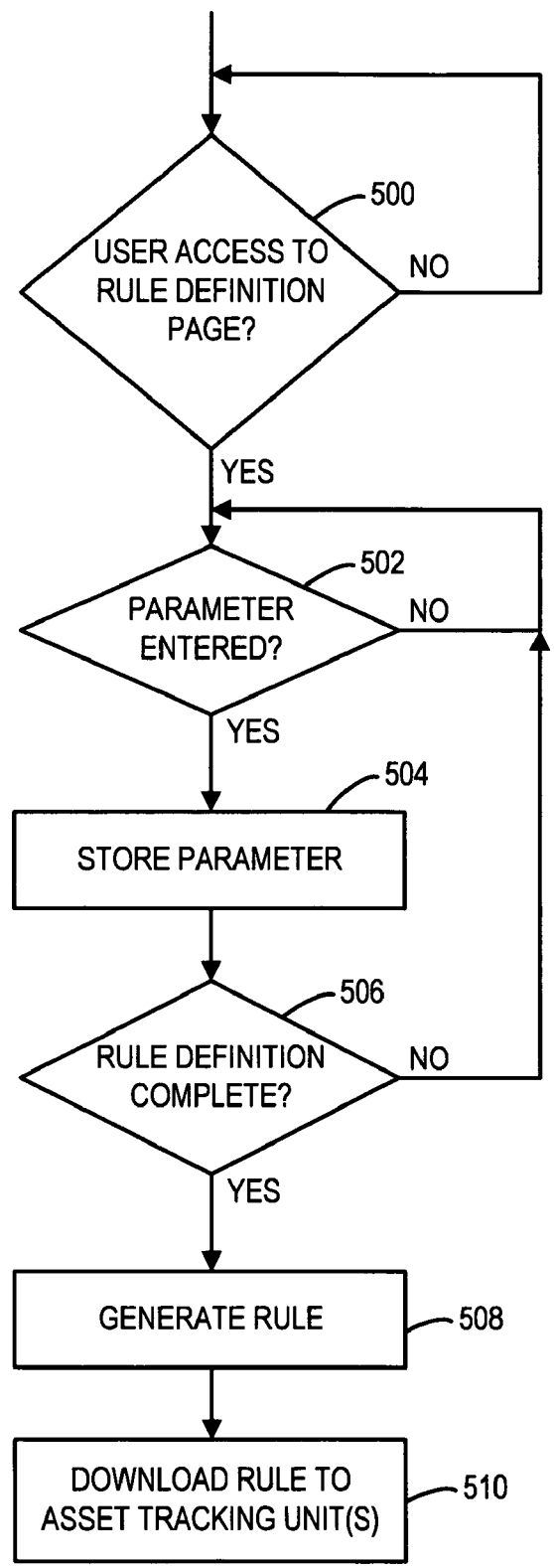
FIG. 5 is a flow chart that illustrates a process performed according to some embodiments by a server computer that is part of the central station of FIG. 4.

FIG. 5 is a flow chart that illustrates aspects of the rule definition software application 412 referred to above in connection with FIG. 4.

In the process illustrated in FIG. 5, it is first determined, at step 500, as to whether a user has accessed a web page maintained by the server computer 400 to allow users to define event masking rules to be downloaded to one or more of the asset tracking units 104. The user may access the event masking rule definition web page, by, e.g., operating a personal computer (not shown) at a location that is remote from the server computer 400. The personal computer may be at least temporarily linked to the communication interface 406 of the server computer 400 via a data communication network which is not shown. In some cases the communication network may be the Internet, or may be a private network (e.g., an intranet) maintained by the proprietor of the central station 108.

Although not indicated in FIG. 5, once the user has accessed the event masking rule definition web page, the user may be allowed to enter data to indicate the asset tracking unit or units which are to receive the event masking rule which the user wishes to define. In some embodiments, the asset tracking unit to receive the event masking rule may be specified by indicating an identifier for the vehicle to which the asset tracking unit is attached.

Upon accessing the event masking rule definition web page, the user may be presented with options that allow the user to enter one or more parameters to define an event masking rule. For example, the user may be permitted to specify one or more of a type or types of events to be masked, times (e.g., periods of the day) during which masking is to occur, geographical areas from which no events are to be reported, etc. Particular examples of masking rules that may be defined by using the event masking rule definition web page will be provided below, and from these examples the reader will further understand the nature of at least some examples of the parameters that may be entered by the user into the event masking rule definition web page.

Following step 500 is step 502, at which the rule definition software application determines whether the user has entered a parameter for the event masking rule to be defined. If so, the entered parameter is stored in the storage device(s) 408, as per step 504 in FIG. 5. It is next determined, at step 506, whether all required parameters for an event masking rule have been entered and the user has indicated that he or she has completed entering parameters for the event masking rule. If a negative determination is made at step 506, then the process may loop back to step 502 to allow the user to enter additional parameters and/or to change parameters that have previously been entered. However, if a positive determination is made at step 506 (i.e., if it is determined that entry of parameters for the event masking rule is complete), then the process advances to step 508. At step 508, the server computer, under the control of rule definition software application 412, generates the event masking rule based on the parameters entered by the user.

Following are examples of event masking rules that may be defined in the process of FIG. 5:

Time based door-event masking

A rule of this type may provide that vehicle (e.g., trailer) door opening and/or closing events are to be reported only during certain hours when such activities are not expected to occur. For example, one rule may provide that door events are to be reported only between the hours of 11:00 p.m. to 4:00 a.m. Thus, this rule provides that door events are to be masked (not reported) during the hours from 4:00 a.m. to 11:00 p.m.

Time based cargo-unload-event masking

A rule of this type may provide that events in which a cargo is removed from a trailer are to be reported only during certain hours when unloading is not expected to occur. One example of such a rule would be to mask (not report) cargo unloading events between the hours of 6:00 a.m. to 6:00 p.m.

Time based hook-event masking

A rule of this type may provide that coupling of a trailer to a truck tractor is to be reported only during certain hours when the trailer is not expected to be coupled to a tractor. One example of such a rule would be to mask (not report) either a coupling event or a coupled status between the hours of 5:00 a.m. to 10:00 p.m. Assume, in another example, that a trailer is expected to be coupled to a tractor at 6:00 a.m. on Monday for a transcontinental haul and to be de-coupled from the tractor at 5:00 p.m. on Friday. In this example, a rule for the asset tracking unit attached to the trailer may provide that any de-coupling event in the period from 6:00 a.m. Monday to 5:00 p.m. Friday is to be reported, but that any de-coupling event outside of that time period is not to be reported.

Location based door-event masking

Assume that the trailer is to be moved from a departure location at which a cargo is to be loaded to a destination location at which a cargo is to be delivered. A rule of this type may provide that door events are not to be reported when the trailer is at (or close to) the departure location or destination location, but that all other door events are to be reported. A corresponding rule for cargo sensor events could similarly be established.

Time based "geo-fence"-event masking

It has been proposed to program asset tracking units to observe a "geo-fence"; that is, the asset tracking units are to declare an event (e.g., generate a report to the central station) whenever the vehicle to which the asset tracking unit is attached departs from a predetermined geographical area. To further refine the geo-fencing concept, geo-fence events may be masked at certain times. For example, during working hours the vehicle may be allowed to depart from the "geo-fenced" area without an event being reported. To more explicitly state an example of an event masking rule of this type, any geo-fence event is to be masked (not reported) during the hours from 7:00 a.m. to 8:00 p.m.

Distance based masking of hook events

Assume that a user does not wish to be notified of occasions when a trailer is only being shunted around a parking facility or otherwise is not being significantly moved. In this case an event masking rule may be defined such that an event in which the trailer is coupled to a truck tractor is not reported unless and until the trailer is moved by a predetermined distance from the location at which the coupling event occurred.

Suppression of repetitive door events

Assume that normal operation of a trailer entails frequent opening and closing of the trailer door. A user of the system may decide that reporting of each door event provides little or no benefit. Accordingly, an event masking rule may be defined such that a door event is reported only if no door event has previously occurred and/or been reported within the last X minutes and/or hours.

Suppression of isolated door events

Assume that normal operation of a trailer does not usually entail frequent door events. A user of the system may decide that occurrence of a certain number of door events within a short period of time may be indicative of unauthorized activity which should be reported. In this case, an event masking rule may be defined such that a door event is reported only if N door events have previously been detected in the last X minutes and/or hours.

Those of ordinary skill in the art will appreciate that variations on these event masking rules, as well as other types of event masking rules, may also be supported for definition by the event masking rule definition web page referred to above. It will equally be appreciated that the event masking rule definition web page may only support definition of one or more of the types of event masking rule referred to above, rather than supporting definition of all of these types of event masking rule.

More generally, any one or more of the events referred to above—including opening or closing of a vehicle's door(s), coupling or uncoupling of a truck trailer to or from a truck tractor, loading or unloading of cargo, excessive vibration, collision, excessive tilting, and detecting or failure to detect one or more RFID tags—or other types of events, may be masked in response to one or more event masking rules.

Referring again to FIG. 5, step 510 follows step 508. At step 510, the server computer 400 transmits (via communication interface 406, satellite earth station equipment 424 and communication satellites 110) to the designated asset tracking unit(s) the event masking rule generated at step 508. (Or, in some embodiments, the user may be allowed to enter parameters for more than one event masking rule in a single session with the event masking rule definition web page, and all of the rules defined in a single session may be downloaded to the designated asset tracking units at step 510.) Although not separately indicated in FIG. 5, it should be understood that the designated asset tracking unit(s) are also programmed to receive and store the downloaded event masking rule(s) and to have subsequent reporting behavior governed by the downloaded event masking rule(s).

Figure 6:
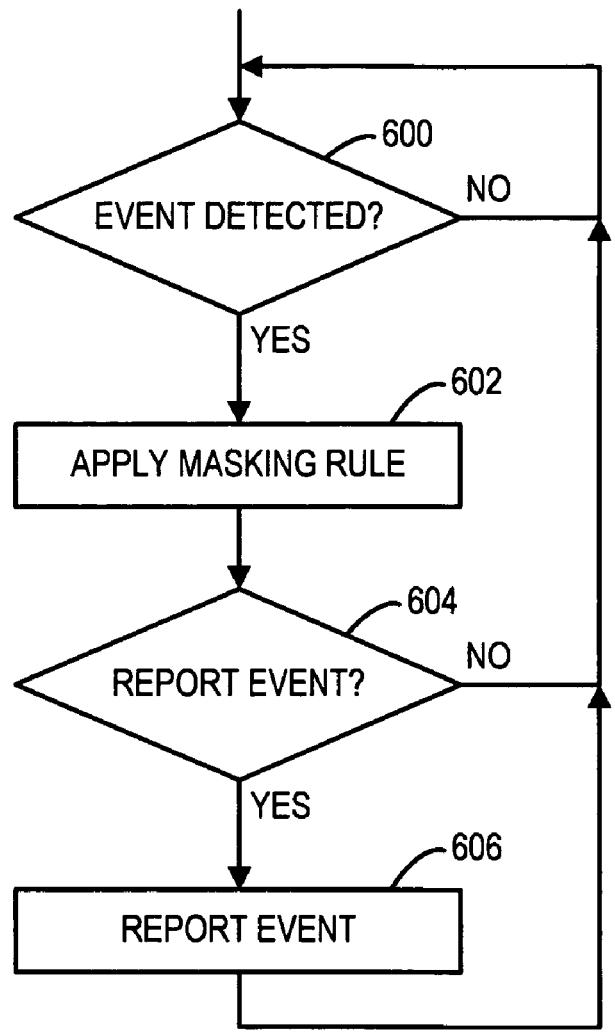
FIG. 6 is a flow chart that illustrates a process performed according to some embodiments by one or more of the asset tracking units that are part of the asset tracking system of FIG. 1.

FIG. 6 is a flow chart that illustrates a generic process performed in accordance with the invention by at least some of the asset tracking units 104.

At step 600 in FIG. 6, the asset tracking unit (more specifically, for example, the secondary processor 214 (FIG. 2) of the asset tracking unit) determines whether an event of a certain kind has been detected. Detecting of events may be considered to be performed by sensors such as the sensors 302, 304, 306 and/or by the controller (e.g., secondary processor 214 and/or main controller 200) of the asset tracking unit 104. Detection of events by the controller of the asset tracking unit may, but need not, be based on a signal or signals received from one or more sensors. The types of events that may be detected at 600 may include opening or closing of a door of a vehicle (e.g., truck trailer) to which the asset tracking unit is attached, loading of cargo into or unloading of cargo from a trailer to which the asset tracking unit is attached, coupling or de-coupling a trailer to which the asset tracking unit is attached to or from a truck trailer, or movement of the vehicle by a certain distance and/or into or out of a specified geographic area.

If a positive determination is made at step 600 (i.e., if an event is detected), step 602 follows. At step 602, the asset tracking unit applies any relevant event masking rule that has been stored in the asset tracking unit. It is then determined, at step 604, whether any applicable rule calls for masking or reporting the event. For example, the current time or location of the asset tracking unit may be considered to determine whether the event is to be masked.

If at step 604 it is determined that the event is not to be reported, then the process loops back to step 600 without reporting the event. However, if it is determined that the event is to be reported, then step 606 is performed, resulting in reporting of the event. For example, to report the event, the asset tracking unit 104 may transmit a suitable message to the server computer 400 via the transceiver/modem 208, and the communication satellite system 110.

Figure 7:
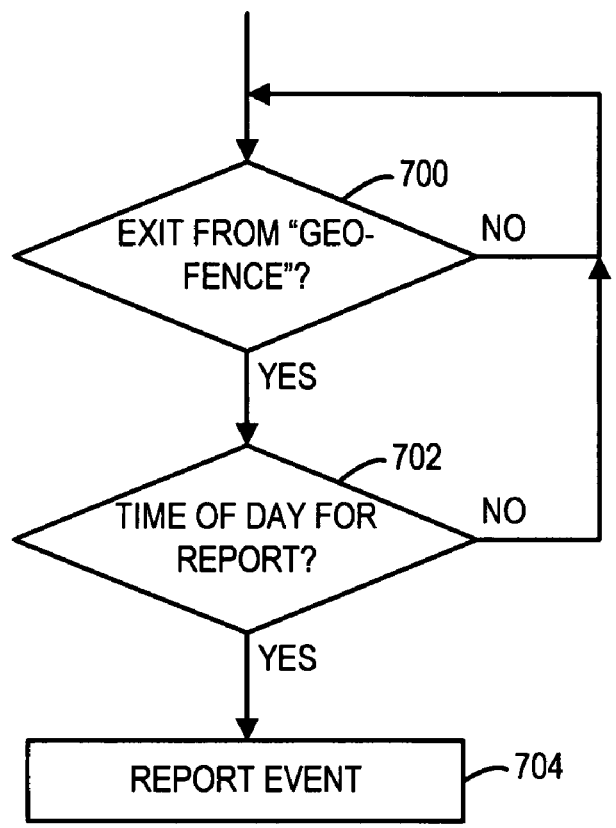
FIG. 7 is a flow chart that illustrates a process performed according to some embodiments by one or more of the asset tracking units that are part of the asset tracking system of FIG. 1.

FIG. 7 is a flow chart that illustrates a process that may be performed by one or more of the asset tracking units 104 to implement a time based geo-fence event masking rule.

At step 700 in the process, the asset tracking unit determines whether an event has occurred in which the vehicle to which the asset tracking unit is attached has exited from a predetermined geographical area. The geographical area may have been defined by a user via input to the server computer 400 (e.g., via the event masking rule definition web page or by a similar page for inputting geo-fence parameters). The detection of the geo-fence event may result from position fixes performed at regular time intervals by the asset tracking unit in accordance with conventional practices.

If a positive determination is made at step 700 (i.e., if a geo-fence event is detected), step 702 follows. At step 702 it is determined, in accordance with an applicable event masking rule, whether the current time of day is such that the geo-fence event should be masked.

If at step 702 it is determined that the geo-fence event is not to be reported, then the process loops back to step 700 without reporting the geo-fence event. However, if it is determined that the geo-fence event is to be reported, then step 704 is performed, resulting in reporting of the geo-fence event. For example, to report the geo-fence event, the asset tracking unit 104 may transmit a suitable message to the server computer 400 via the transceiver/modem 208, and the communication satellite system 110.

Figure 8:
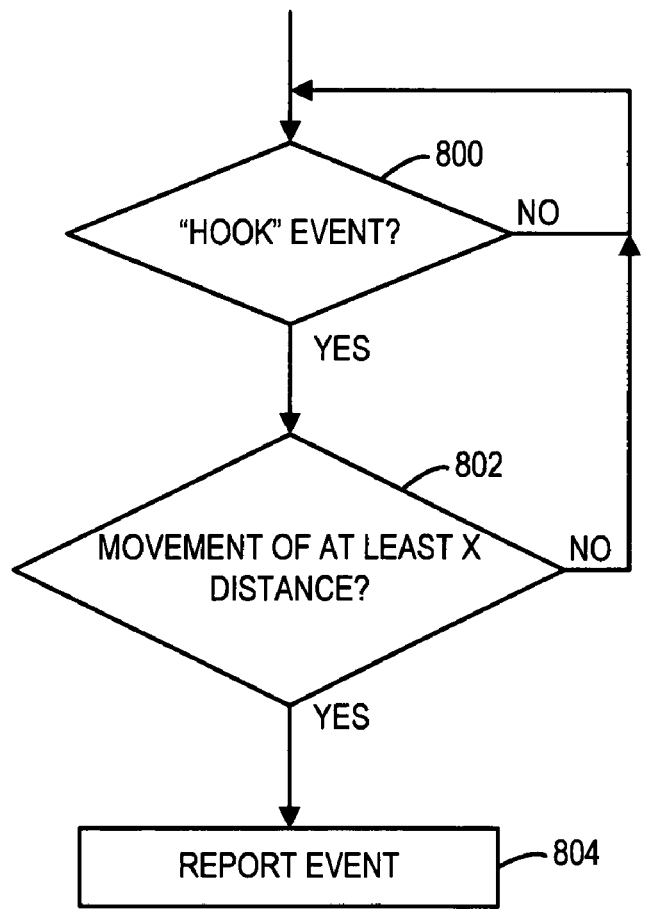
FIG. 8 is a flow chart that illustrates a process performed according to some embodiments by one or more of the asset tracking units that are part of the asset tracking system of FIG. 1.

FIG. 8 is a flow chart that illustrates a process that may be performed by one or more of the asset tracking units 104 to implement distance based masking of "hook" events.

At step 800 in the process, the asset tracking unit determines whether an event has been detected in which a trailer to which the asset tracking unit is attached has been coupled to a truck tractor. If a positive determination is made at step 800 (i.e., if a hook event is detected), step 802 follows. At step 802 the asset tracking unit operates to determine whether the trailer is moved by at least a predetermined distance from the location at which the hook event occurred. If a negative determination is made at step 802, then the process loops back to step 800 without reporting the hook event. However, if it is determined that the specified degree of movement of the trailer occurred after the hook event, then step 804 is performed, resulting in reporting of the hook event. For example, to report the hook event, the asset tracking unit 104 may transmit a suitable message to the server computer 400 via the transceiver/modem 208 and the communication satellite system 110.

Figure 9:
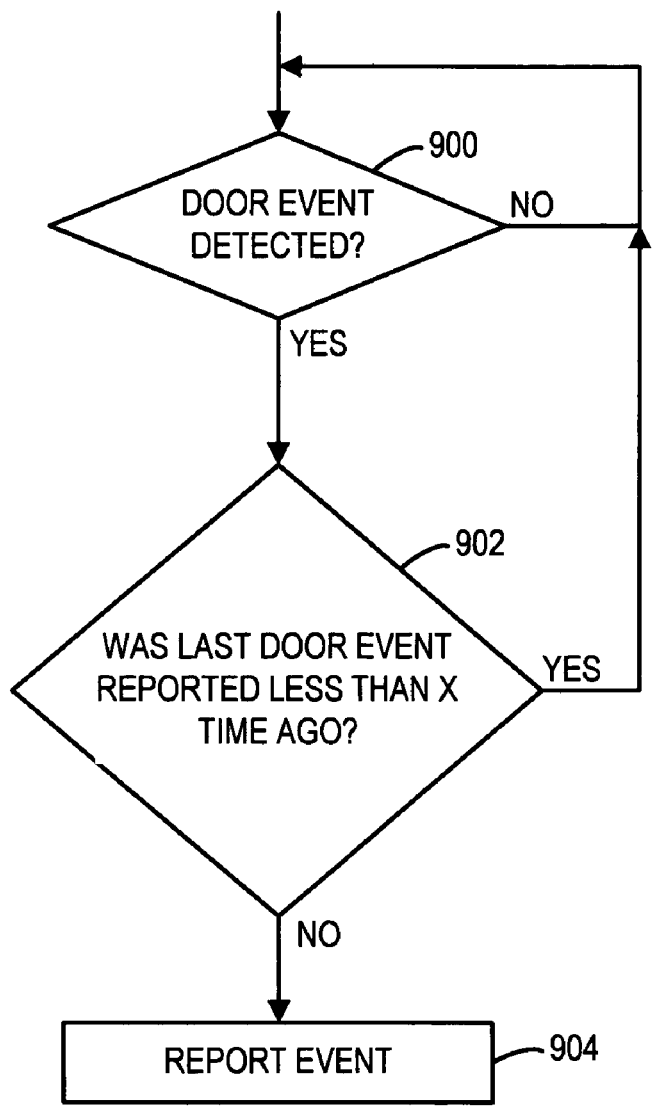
FIG. 9 is a flow chart that illustrates a process performed according to some embodiments by one or more of the asset tracking units that are part of the asset tracking system of FIG. 1.

FIG. 9 is a flow chart that illustrates a process that may be performed by one or more of the asset tracking units 104 to implement masking of repetitive door events.

At step 900 of the process, the asset tracking unit determines whether a door event (e.g. opening or closing—or either one—of a door of a vehicle to which the asset tracking unit is attached) has been detected. If a positive determination is made at step 900 (i.e., if a door event is detected), step 902 follows. At step 902, it is determined whether the last door event reported (or the last door event detected) occurred within a predetermined period of time prior to the door event detected at step 900. If a positive determination is made at step 902 (i.e., if it is determined that the most recent door event was within the predetermined prior period of time), then the process loops back to step 900 without reporting the door event detected at step 900. However, if it is determined at step 902 that there has not been a previous recent door event, then step 904 is performed, resulting in reporting of the door event detected at step 900. For example, to report the door event detected at step 900, the asset tracking unit may transmit a suitable message to the server computer 400 via the transceiver/modem 208 and the communication satellite system 110.

Figure 10:
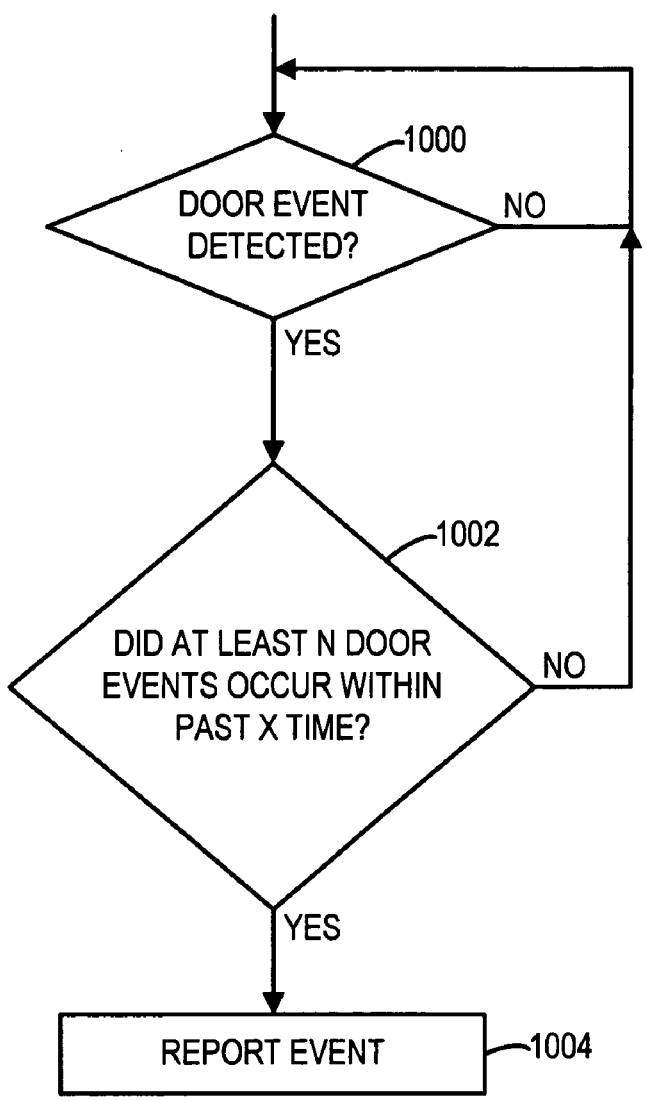
FIG. 10 is a flow chart that illustrates a process performed according to some embodiments by one or more of the asset tracking units that are part of the asset tracking system of FIG. 1.

FIG. 10 is a flow chart that illustrates a process that may be performed by one or more of the asset tracking units 104 to implement masking of isolated door events.

At step 1000 of the process, the asset tracking unit determines whether a door event (e.g. opening or closing— or either one—of a door of a vehicle to which the asset tracking unit is attached) has been detected. If a positive determination is made at step 1000 (i.e., if a door event is detected), step 1002 follows. At step 1002, it is determined whether at least a certain number of door events (e.g., one or more) have been detected within a predetermined period of time prior to the door event detected at step 1000. If a negative determination is made at step 1002 (i.e., if it is determined that the specified number of door events has not occurred in the specified period prior to the door event detected at step 1000), then the process loops back to step 1000 without reporting the door event detected at step 1000. However, if it is determined at step 1002 that the specified number of door events has been detected in the specified prior period, then step 1004 is performed, resulting in reporting of the door event detected at step 1000. For example, to report the door event detected at step 1000, the asset tracking unit may transmit a suitable message to the server computer 400 via the transceiver modem 208 and the communication satellite system 110.

Once an asset tracking unit 104 has reported an event to the central station 108, appropriate actions may be taken at the central station in response to receiving the report of the event. For example, the server computer may cause a user/attendant to receive an alert to indicate that the event has been reported. The alert may take the form of a pop-up window displayed on a monitor that is viewed by the user/attendant. In addition or alternatively, the alert may take the form of an electronic mail message and/or an automatically placed telephone call (e.g., to a cellular telephone carried by a user) and/or a pager message. The user may take steps to investigate the reported event, to contact the driver of the vehicle (or of the truck tractor to which the vehicle is coupled), to contact management employees, etc.

In addition or alternatively, the event may be logged in a database, or an alert based on the reported event may be logged in a database (e.g., database 422, FIG. 4) and may be tracked to determine whether appropriate actions have been taken in response to the event/alert. In addition or alternatively, a report may subsequently be printed and/or displayed listing the event/alert together with other events/alerts that have occurred during a particular time period.

In some embodiments, some or all events may be reported by some or all asset tracking units, and some or all event masking rules may be implemented at the central station. That is, the central station may determine based on one or more event masking rules whether to report an event (reported to the central station by an asset tracking unit) to a user/attendant, whether to defer reporting of an event to a later (e.g., more routine) occasion for reporting, whether or not to initiate an alert, whether or not to store data indicative of the event, etc.

In some embodiments, instead of or in addition to downloading event masking rules to asset tracking units from the server computer, at least some event masking rules may be programmed into the asset tracking units upon initial manufacturing or programming of the asset tracking units and/or at other times by interfacing the asset tracking units to a personal computer which is used by a user to define and/or input event masking rules and to communicate the event masking rules from the personal computer to the asset tracking units.

Also, event masking parameters and/or other user input related to event masking rules may be entered into the server computer by procedures other than or in addition to accessing a web page. For example, event masking parameters may be entered into a database in the server computer by back-office entry (e.g., by a human operator) and/or electronically by, e.g., receiving an electronic mail message from a remote user and parsing the electronic mail message to extract event masking parameters from the message. Once entered in the server computer, by whatever method, event masking parameters may be processed to generate a corresponding event masking rule. The event masking rule may be downloaded to an asset tracking unit or units and/or may be applied at the server computer. In the latter case, the event masking rule may call for suppressing (or not suppressing) event reporting, alerts, etc., in regard to conditions not known to asset tracking units. Such conditions may include, for example, terror alert level, shipment status (e.g., whether the shipment is urgent), and so forth.

The principles of event masking described herein are generally applicable to asset tracking systems and/or units, whether or nor GPS is employed therein.

Application of event masking rules, at either or both of the asset tracking units and the central station, may achieve one or more of the following benefits:

(1) Reduced burdens on users/attendants and/or lower labor costs;

(2) More effective responses to important events;

(3) Reduced demands on battery power supplies of asset tracking units;

(4) Reduced use of/expenditures upon satellite communication messaging to report events.

The present invention has the technical effect of improving operation of a GPS based asset tracking system or other type of asset tracking system.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
    entering an event masking parameter into a server computer;
    generating an event masking rule based at least in part on the entered event masking parameter;
    downloading the event masking rule from the server computer to an asset tracking unit;
    detecting an event, said detecting occurring at the asset tracking unit; and
    determining at the asset tracking unit, based at least in part on the downloaded event masking rule, whether to report the detected event;
    wherein the detected event is at least one of: coupling to a truck tractor of a truck trailer to which the asset tracking unit is attached; and de-coupling from a truck tractor of a truck trailer to which the asset tracking unit is attached.

2. The method of claim 1, wherein the downloading occurs at a time when the asset tracking unit is attached to a transportation vehicle.

3. The method of claim 2, wherein the transportation vehicle is a truck trailer.

4. The method of claim 2, wherein the transportation vehicle is a cargo container.

5. The method of claim 1, wherein the event masking rule provides that the detected event is not to be reported during certain hours of a day.

6. The method of claim 1, wherein the event masking rule provides that the detected event is not to be reported at times when the asset tracking unit is not within a certain geographical area.

7. The method of claim 1, wherein the event masking rule provides that the detected event is not to be reported at times when the asset tracking unit is within a certain geographical area.

8. A method comprising:
providing an asset tracking unit that is attached to a transportation vehicle;
detecting an event that is related to the transportation vehicle, said detecting occurring at the asset tracking unit; and
determining, based at least in part on an event masking rule, whether to report the detected event;
wherein the detected event is at least one of: coupling of the transportation vehicle to a truck tractor; and de-coupling of the transportation vehicle from a truck tractor.

9. The method of claim 8, wherein the event masking rule provides that the detected event is not to be reported during certain hours of a day.

10. The method of claim 8, wherein the event masking rule provides that the detected event is not to be reported at times when the asset tracking unit is not within a certain geographical area.

11. The method of claim 8, wherein the event masking rule provides that the detected event is not to be reported at times when the asset tracking unit is within a certain geographical area.

12. The method of claim 8, wherein the determining step is performed at the asset tracking unit.

13. The method of claim 8, wherein the determining step is performed at a central station.

14. The method of claim 8, wherein the transportation vehicle is a truck trailer.

15. The method of claim 8, wherein the transportation vehicle is a cargo container.

16. A method comprising:
providing an asset tracking unit that is attached to a truck trailer;
detecting an event in which the truck trailer is coupled to a truck tractor; and
reporting that the truck trailer has been coupled to the truck tractor only if the asset tracking unit detects that the truck trailer is moved by at least a predetermined distance after the asset tracking unit detects that the truck trailer has been coupled to the truck.

17. A method comprising:
providing an asset tracking unit that is attached to a transportation vehicle;
detecting an event in which a door of the transportation vehicle is opened or closed; and
refraining from reporting the event unless the event occurred within less than a predetermined period of time after at least one prior event in which the door was opened or closed.

18. An asset tracking system comprising:
a server computer;
a plurality of asset tracking units, each attached to a respective transportation vehicle; and
a central station;
the server computer programmed to:
receive inputs from at least one user to enter at least one event masking parameter;
generate at least one event masking rule based at least in part on the entered at least one event masking parameter; and
download the at least one event masking rule to at least one of the asset tracking units; and
the at least one of the asset tracking units programmed to:
receive and store a downloaded event masking rule;
detect an event; and
determine, based at least in part on the downloaded at least one event masking rule, whether to report the detected event to the central station;
wherein the detected event is at least one of: coupling one of the transportation vehicles to a truck tractor; and de-coupling one of the transportation vehicles from a truck tractor.

19. The asset tracking system of claim 18, wherein each of the asset tracking units includes a GPS (Global Positioning System) receiver.

20. The asset tracking system of claim 18, wherein the downloaded event masking rule provides that the detected event is not to be reported during certain hours of a day.

21. The asset tracking system of claim 18, wherein the downloaded event masking rule provides that the detected event is not to be reported at times when the asset tracking unit is not within a certain geographical area.

22. The asset tracking system of claim 18, wherein the downloaded event masking rule provides that the detected event is not to be reported at times when the asset tracking unit is within a certain geographical area.

23. The asset tracking system of claim 18, wherein the central station includes the server computer.

24. The asset tracking system of claim 18, wherein at least some of the transportation vehicles are truck trailers.

25. The asset tracking system of claim 18, wherein at least some of the transportation vehicles are cargo containers.

* * * * *